(12) United States Patent
Matthews

(10) Patent No.: US 9,151,240 B2
(45) Date of Patent: Oct. 6, 2015

(54) CONTROL SYSTEM AND METHOD FOR A HOMOGENEOUS CHARGE COMPRESSION IGNITION (HCCI) ENGINE

(75) Inventor: Gregory P. Matthews, West Bloomfield, MI (US)

(73) Assignee: GM Global Technology Operations LLC, Detroit, MI (US)

(*) Notice: Subject to any disclaimer, the term of this patent is extended or adjusted under 35 U.S.C. 154(b) by 1186 days.

(21) Appl. No.: 13/083,894

(22) Filed: Apr. 11, 2011

(65) Prior Publication Data

US 2012/0259529 A1 Oct. 11, 2012

(51) Int. Cl.
| | |
|---|---|
| F02D 41/06 | (2006.01) |
| F02D 41/30 | (2006.01) |
| F02D 41/14 | (2006.01) |
| F02D 41/00 | (2006.01) |

(52) U.S. Cl.
CPC ........ F02D 41/3041 (2013.01); F02D 41/1497 (2013.01); *F02D 41/0072* (2013.01); *F02D 2200/0616* (2013.01); *F02D 2200/1004* (2013.01); *Y02T 10/128* (2013.01)

(58) Field of Classification Search
CPC .... F02B 1/08; F02B 17/005; F02B 2075/125; Y02T 10/18; F02D 13/0203; F02D 41/3064; F02D 41/3035; F02D 41/3076; F02D 2041/1437; F02D 41/3029
USPC ............... 123/568.11, 568.21, 568.22, 90.15, 123/90.16, 90.23; 701/101, 102, 103, 104, 701/105, 106, 110, 108, 114, 115
See application file for complete search history.

(56) References Cited

U.S. PATENT DOCUMENTS

| | | | |
|---|---|---|---|
| 5,036,668 | A | 8/1991 | Hardy |
| 5,051,909 | A | 9/1991 | Gomez et al. |
| 5,253,619 | A | 10/1993 | Richeson et al. |
| 6,178,943 | B1 | 1/2001 | Taga et al. |
| 6,267,097 | B1 | 7/2001 | Urushihara et al. |
| 6,276,334 | B1 | 8/2001 | Flynn et al. |
| 6,293,246 | B1 | 9/2001 | Tanahashi et al. |
| 6,295,973 | B1 | 10/2001 | Yang |
| 6,308,682 | B1 | 10/2001 | Ma |
| 6,336,436 | B1 | 1/2002 | Miyakubo et al. |
| 6,343,581 | B2 | 2/2002 | Suzuki |
| 6,390,054 | B1 | 5/2002 | Yang |
| 6,450,136 | B1 | 9/2002 | Klomp et al. |
| 6,463,889 | B2 | 10/2002 | Reddy |
| 6,497,213 | B2 | 12/2002 | Yoshizawa et al. |
| 6,516,774 | B2 | 2/2003 | zur Loye et al. |
| 6,570,265 | B1 | 5/2003 | Shiraishi et al. |
| 6,615,771 | B2 | 9/2003 | Denger et al. |
| 6,619,254 | B2 | 9/2003 | Chmela et al. |
| 6,619,255 | B2 | 9/2003 | Urushihara et al. |

(Continued)

FOREIGN PATENT DOCUMENTS

| | | |
|---|---|---|
| CN | 101495729 A | 7/2009 |
| JP | 2000-320333 A | 11/2000 |

(Continued)

*Primary Examiner* — Hai Huynh
*Assistant Examiner* — Raza Najmuddin

(57) ABSTRACT

A system includes a mass determination module and a torque estimation module. The mass determination module determines a fuel mass injected into a cylinder of a homogeneous charge compression ignition (HCCI) engine for a combustion event in the cylinder. The torque estimation module estimates a torque output of the HCCI engine based on the fuel mass.

22 Claims, 5 Drawing Sheets

(56) References Cited

U.S. PATENT DOCUMENTS

| | | | |
|---|---|---|---|
| 6,622,710 B2 | 9/2003 | Hasegawa et al. | |
| 6,637,393 B2 | 10/2003 | Sutherland | |
| 6,637,404 B2 | 10/2003 | Fuerhapter et al. | |
| 6,662,785 B1 | 12/2003 | Sloane et al. | |
| 6,668,790 B2 | 12/2003 | Chmela et al. | |
| 6,675,579 B1 | 1/2004 | Yang | |
| 6,704,639 B2 * | 3/2004 | Amano | 701/102 |
| 6,725,825 B1 | 4/2004 | Kurtz et al. | |
| 6,739,295 B1 | 5/2004 | Yamaoka et al. | |
| 6,769,403 B2 | 8/2004 | Rayl et al. | |
| 6,772,585 B2 | 8/2004 | Iihoshi et al. | |
| 6,923,167 B2 | 8/2005 | Flowers | |
| 6,948,482 B2 | 9/2005 | Kilkenny et al. | |
| 6,951,201 B2 | 10/2005 | Zhu et al. | |
| 6,957,640 B1 | 10/2005 | Liu et al. | |
| 6,964,256 B2 | 11/2005 | Kataoka et al. | |
| 6,971,343 B2 | 12/2005 | Hitomi et al. | |
| 6,971,365 B1 | 12/2005 | Najt et al. | |
| 6,994,072 B2 | 2/2006 | Kuo et al. | |
| 7,021,276 B2 | 4/2006 | Liu et al. | |
| 7,036,482 B2 | 5/2006 | Beck et al. | |
| 7,059,281 B2 | 6/2006 | Kuo et al. | |
| 7,080,613 B2 | 7/2006 | Kuo et al. | |
| 7,082,898 B2 | 8/2006 | Kitamura et al. | |
| 7,089,908 B2 | 8/2006 | Fujieda et al. | |
| 7,104,349 B2 | 9/2006 | Gray, Jr. | |
| 7,121,233 B2 | 10/2006 | Kitamura et al. | |
| 7,121,254 B2 | 10/2006 | Wickman et al. | |
| 7,121,255 B2 | 10/2006 | Liu et al. | |
| 7,128,062 B2 | 10/2006 | Kuo et al. | |
| 7,134,409 B2 | 11/2006 | Mitani et al. | |
| 7,168,420 B1 | 1/2007 | Yang | |
| 7,194,996 B2 | 3/2007 | Koopmans | |
| 7,210,457 B2 | 5/2007 | Kuzuyama | |
| 7,213,572 B2 | 5/2007 | Yang | |
| 7,234,438 B2 | 6/2007 | Yang | |
| 7,240,659 B2 | 7/2007 | Yang | |
| 7,263,968 B2 | 9/2007 | Cairns et al. | |
| 7,274,986 B1 | 9/2007 | Petridis et al. | |
| 7,357,103 B2 | 4/2008 | Koopmans | |
| 7,367,310 B2 | 5/2008 | Kakuya et al. | |
| 7,370,616 B2 | 5/2008 | Kuo et al. | |
| 7,461,628 B2 | 12/2008 | Blumberg et al. | |
| 7,469,672 B2 | 12/2008 | Andri | |
| 7,478,620 B2 | 1/2009 | Kuo et al. | |
| 7,529,637 B2 | 5/2009 | Snyder | |
| 7,610,897 B2 | 11/2009 | Rayl | |
| 7,729,844 B2 | 6/2010 | Rayl et al. | |
| 7,827,944 B2 | 11/2010 | Pierik | |
| 7,845,319 B2 | 12/2010 | Rayl | |
| 7,866,286 B2 | 1/2011 | Sun | |
| 7,974,766 B2 | 7/2011 | Rayl | |
| 7,975,668 B2 | 7/2011 | Ramappan et al. | |
| 7,979,195 B2 | 7/2011 | Rayl | |
| 8,220,436 B2 | 7/2012 | Rayl et al. | |
| 8,326,511 B2 * | 12/2012 | Shibata et al. | 701/84 |
| 2002/0121263 A1 | 9/2002 | Chmela et al. | |
| 2003/0204302 A1 * | 10/2003 | Amano | 701/102 |
| 2003/0230276 A1 | 12/2003 | Kataoka et al. | |
| 2004/0084010 A1 | 5/2004 | Kurtz et al. | |
| 2004/0129245 A1 | 7/2004 | Hitomi et al. | |
| 2004/0182359 A1 | 9/2004 | Stewart et al. | |
| 2005/0081511 A1 | 4/2005 | Tomita et al. | |
| 2005/0211218 A1 | 9/2005 | Liu et al. | |
| 2005/0216165 A1 * | 9/2005 | Ito | 701/84 |
| 2005/0288846 A1 | 12/2005 | Liu et al. | |
| 2006/0174853 A1 | 8/2006 | Koopmans | |
| 2006/0196466 A1 | 9/2006 | Kuo et al. | |
| 2006/0196467 A1 | 9/2006 | Kang et al. | |
| 2006/0196468 A1 | 9/2006 | Chang et al. | |
| 2006/0196469 A1 | 9/2006 | Kuo et al. | |
| 2006/0219214 A1 | 10/2006 | Okude et al. | |
| 2006/0236958 A1 | 10/2006 | Sun et al. | |
| 2006/0243241 A1 | 11/2006 | Kuo et al. | |
| 2007/0062483 A1 | 3/2007 | Yang | |
| 2007/0062484 A1 | 3/2007 | Yang | |
| 2007/0062486 A1 | 3/2007 | Yang | |
| 2007/0204830 A1 | 9/2007 | Andri | |
| 2007/0204838 A1 | 9/2007 | Leone et al. | |
| 2007/0215095 A1 | 9/2007 | Kakuya et al. | |
| 2008/0066459 A1 | 3/2008 | O'Neill | |
| 2008/0066713 A1 | 3/2008 | Megli et al. | |
| 2008/0257306 A1 | 10/2008 | Chen et al. | |
| 2009/0048760 A1 | 2/2009 | Chen et al. | |
| 2009/0229563 A1 | 9/2009 | Rayl et al. | |
| 2010/0211294 A1 * | 8/2010 | Soejima | 701/108 |
| 2011/0132318 A1 | 6/2011 | Rayl et al. | |
| 2011/0238280 A1 * | 9/2011 | Shibata et al. | 701/102 |

FOREIGN PATENT DOCUMENTS

| | | |
|---|---|---|
| JP | 2001-003800 A | 1/2001 |
| JP | 2006-046303 A | 2/2006 |
| JP | 2007-040235 A | 2/2007 |
| JP | 2007-064210 A | 3/2007 |
| JP | 2010216887 | 3/2009 |
| WO | WO-2007/017109 A1 | 2/2007 |

* cited by examiner

CONTROL SYSTEM AND METHOD FOR A HOMOGENEOUS CHARGE COMPRESSION IGNITION (HCCI) ENGINE

FIELD

The present disclosure relates to control systems and methods for homogeneous charge compression ignition (HCCI) engines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Homogeneous charge compression ignition (HCCI) engines combine aspects of spark ignition (SI) engines and stratified charge compression ignition (SCCI) engines to achieve emissions similar to SI engines and fuel efficiency similar to SCCI engines. In SI engines, air and fuel are mixed together and spark ignites the air-fuel mixture. In SCCI engines, air and fuel are mixed together and combustion occurs at the boundary of the air/fuel mixing due to compression. In HCCI engines, ignition occurs at several places at a time, which combust the air/fuel mixture faster than SI or SCCI engines.

Powertrain control systems and methods have been developed to control powertrain components, such as an engine and an electric motor, in the torque domain to coordinate the torque output of each component. These control systems and methods may estimate the torque produced by SI or SCCI engines. However, these control systems and methods do not estimate the torque produced by HCCI engines.

SUMMARY

A system includes a mass determination module and a torque estimation module. The mass determination module determines a fuel mass injected into a cylinder of a homogeneous charge compression ignition (HCCI) engine for a combustion event in the cylinder. The torque estimation module estimates a torque output of the HCCI engine based on the fuel mass.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
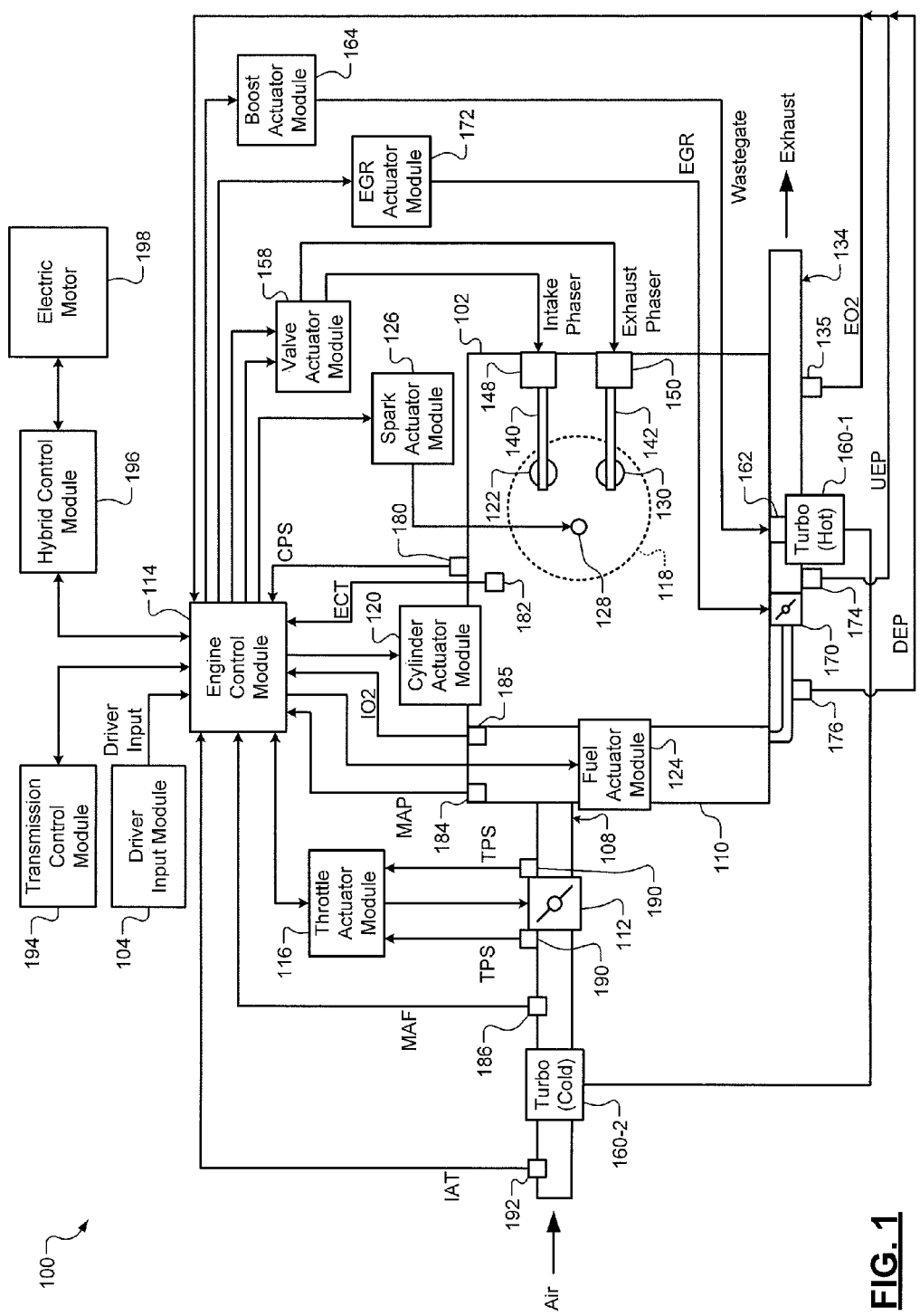
FIG. 1 is a functional block diagram of an example powertrain system according to the principles of the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Combustion in homogeneous charge compression ignition (HCCI) engines is different from combustion in spark ignition (SI) engines or stratified charge compression ignition (SCCI) engines. HCCI engines may operate using multiple fuel injection pulses for each cylinder combustion event, and the combustion duration in HCCI engines is shorter relative to SI engines. Since HCCI engines operate differently than SI or SCCI engines, a different model must be used to estimate the torque output of HCCI engines.

A control system and method according to the principles of the present disclosure estimates a torque output of an HCCI engine based on a fuel mass injected for each cylinder combustion event of the HCCI engine. The torque output may be estimated based on an engine speed, a mass flow rate through an exhaust gas recirculation valve, an oxygen level in an intake manifold, a valve overlap, and/or an air/fuel ratio. The valve overlap is a difference between a first crank angle at which an exhaust valve closes and a second crank angle at which an intake valve opens. The torque output may be estimated based on an angle at which fuel injection is started or stopped when the air/fuel ratio is lean, and the torque output may be estimated based on a spark advance when the air/fuel ratio is stoichiometric.

A control system and method according to the principles of the present disclosure may estimate the torque output of the HCCI engine using a torque estimation model. The torque estimation model may include equations and/or lookup tables that may be used to determine the torque output based on one or more of the above factors. The torque estimation model may be inverted to obtain a mass determination model, and the mass determination model may be used to determine the fuel mass based on one or more of the above factors and a desired torque request.

Referring now to FIG. 1, a functional block diagram of an example powertrain system 100 is presented. The powertrain system 100 includes an engine 102 that combusts an air/fuel mixture to produce drive torque for a vehicle based on driver input from a driver input module 104. Air is drawn into the engine 102 through an intake system 108. For example only, the intake system 108 may include an intake manifold 110 and a throttle valve 112. For example only, the throttle valve 112 may include a butterfly valve having a rotatable blade. An engine control module (ECM) 114 controls a throttle actuator module 116, which regulates the opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which may regulate fuel injection to achieve a desired air/fuel ratio and/or a desired torque. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a homogeneous charge compression ignition (HCCI) engine, and compression in the cylinder 118 may ignite the air/fuel mixture. Alternatively, a spark actuator module 126 may energize a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event.

During the combustion stroke, the combustion of the air/fuel mixture drives the piston down, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through an exhaust valve 130. The byproducts of combustion are exhausted from the vehicle via an exhaust system 134. An oxygen level in the exhaust system 134 may be measured using an exhaust oxygen (EO2) sensor 135.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A valve actuator module 158 may control the intake cam phaser 148 and the exhaust cam phaser 150 based on signals from the ECM 114. When implemented, variable valve lift (not shown) may also be controlled by the valve actuator module 158.

The powertrain system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The powertrain system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172. The pressure of exhaust entering the EGR valve 170 may be measured using an upstream exhaust pressure (UEP) sensor 174, and the pressure of exhaust exiting the EGR valve 170 may be measured using a downstream exhaust pressure (DEP) sensor 176.

The powertrain system 100 may measure the position of the crankshaft using a crankshaft position sensor (CPS) 180. The crankshaft position may be referred to as the crank angle. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. An oxygen level in the intake manifold may be measured using an intake oxygen (102) sensor 185. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the powertrain system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting an angle of the blade of the throttle valve 112.

Similarly, the spark actuator module 126 may be referred to as an actuator, while the corresponding actuator value may be the amount of spark advance relative to cylinder TDC. Other actuators may include the cylinder actuator module 120, the fuel actuator module 124, the valve actuator module 158, the boost actuator module 164, and the EGR actuator module 172. For these actuators, the actuator values may correspond to number of activated cylinders, fueling rate, intake and exhaust cam phaser angles, boost pressure, and EGR valve opening area, respectively. The ECM 114 may control actuator values in order to cause the engine 102 to generate a desired engine output torque.

The ECM 114 estimates the torque output of the engine 102 according to the principles of the present disclosure. The ECM 114 may estimate the torque output of the engine 102 using a torque estimation model that relates engine operating conditions to an estimated torque. The torque estimation model may be specific to HCCI engines. The ECM 114 may determine a fuel mass injected for each cylinder combustion event based on an inverse of the torque estimation model, or a mass determination model, that relates engine operating condition to an estimated mass.

Figure 2:
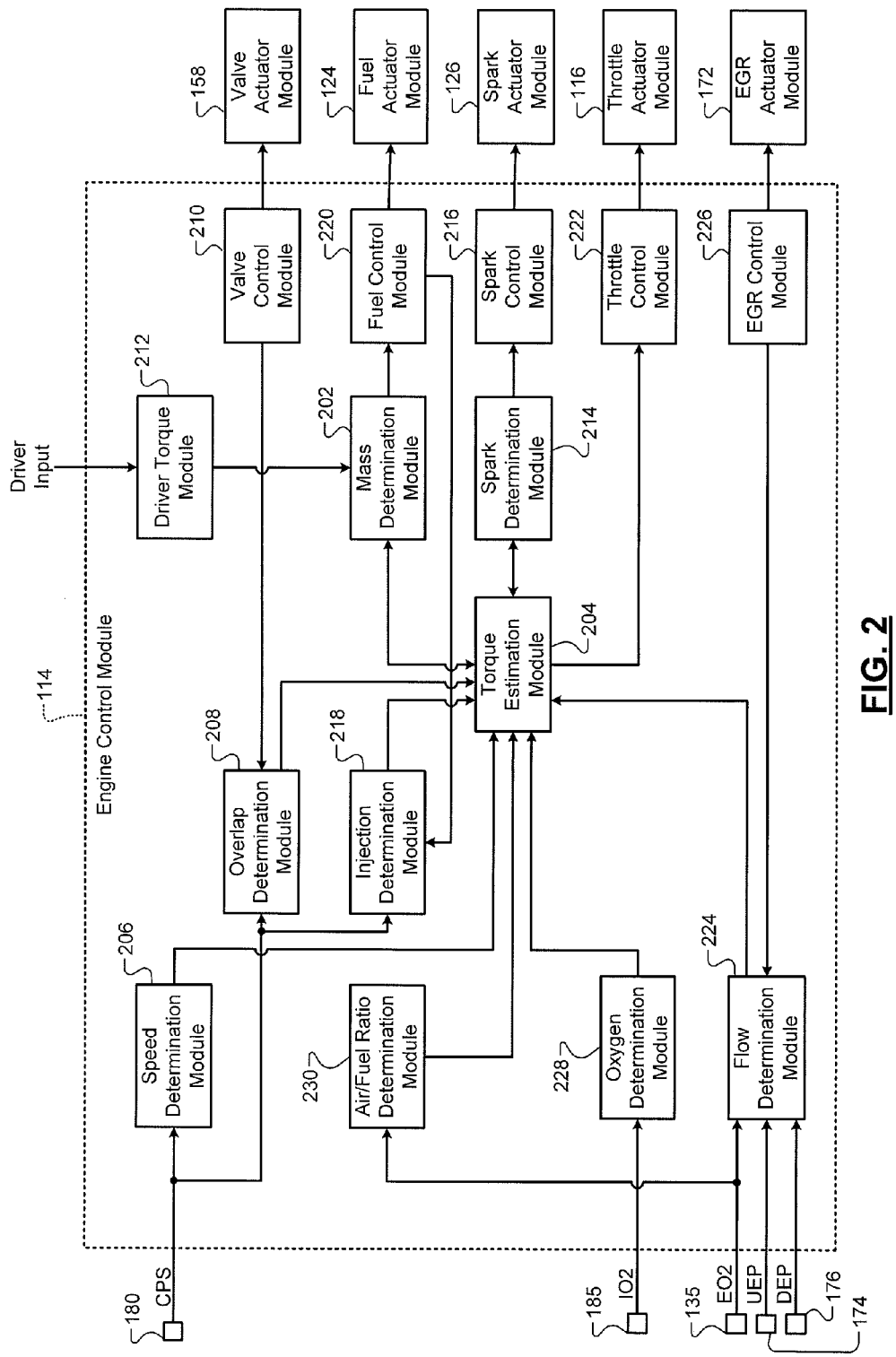
FIG. 2 is a functional block diagram of an example powertrain control system according to the principles of the present disclosure.

Referring now to FIG. 2, the ECM 114 includes a mass determination module 202 and a torque estimation module 204. The torque estimation module 204 estimates the torque output of the engine 102 based on engine operating conditions. The torque estimation module 204 may estimate the torque output using a torque estimation model, such as an equation and/or a lookup table, which relates engine operation conditions to an estimated torque. For example, a torque relationship such as $$T_e = f(N_g, \text{NVO}, m_f, \theta_{spark}, \text{SOI}, \text{EGR}, \text{AFR}) \tag{1}$$

may be defined, where the estimated torque ($T_e$) is a function of an engine speed ($N_g$), a negative valve overlap (NVO), a fuel mass ($m_f$), a spark advance ($\theta_{spark}$), a crank angle at the start of injection (SOI), a mass flow rate through the EGR valve 170 (EGR), and an air/fuel ratio (AFR).

The torque estimation module 204 may use different torque estimation models for different engine operating conditions, such as different air/fuel ratios and/or different fuel injection modes. The ECM 114 may adjust the air/fuel ratio of the engine 102 and/or switch between various fuel injection modes to maximize fuel efficiency while satisfying a driver torque request. The fuel injection mode selected may affect the number of fuel pulses injected per cylinder combustion event, the fuel injection timing, and/or the fuel injection amount. Further discussion of switching operation of an HCCI engine between fuel injections modes can be found in commonly assigned U.S. patent application Ser. No. 12/634, 082, entitled "HCCI Mode Switching Control System and Method."

The torque estimation module 204 may use different torque estimation models for different engine operating conditions to minimize memory usage. For example, if the torque estimation model was represented using a single lookup table, then each injection mode may exponentially increase the number of memory locations required. In contrast, if the torque estimation model was represented using multiple equations and/or multiple lookup tables, then the number of memory locations may be reduced. The torque estimation module 204 may use six torque estimation models for six different fuel injection modes, and the torque estimation module 204 may use lookup tables to determine one or more variables included the six equations.

When the ECM 114 commands a single injection pulse for each cylinder combustion event and the ECM 114 adjusts the air/fuel ratio to stoichiometric, the torque estimation module 204 may use a torque relationship such as $$T_e = \alpha_0 + \alpha_1 {}^*F_1(m_f^2) + \alpha_2 {}^*F_2(m_f) + \alpha_3 {}^*F_3(SPK^2) + \alpha_4 {}^*F_4(SPK) + \alpha_5 {}^*F_5(m_f {}^*SPK) + \alpha_6 {}^*F_6(m_f {}^*SPK^2) + \alpha_7 {}^*F_7(m_f {}^*EGR^2) + \alpha_8 {}^*F_8(EGR) + \alpha_9 {}^*F9(m_f {}^*EGR), \quad (2)$$

where $\alpha$, $\beta$, $\gamma$, $\delta$, and $\epsilon$ are functions of the engine speed and the air/fuel ratio or the negative valve overlap, and $\alpha$, $\beta$, $\gamma$, $\delta$, and $\epsilon$ may be determined using a lookup table.

When the ECM 114 commands a single injection pulse for each cylinder combustion event and the ECM 114 adjusts the air/fuel ratio to lean, the torque estimation module 204 may use a torque relationship such as $$T_e = \beta_0 + \beta_1 {}^*F_1(m_f^2) + \beta_2 {}^*F_2(m_f) + \beta_3 {}^*F_3(SOI^2) + \beta_4 {}^*F_4(SOI) + \beta_5 {}^*F_5(m_f {}^*SOI) + \beta_6 {}^*F_6(m_f {}^*SOI^2) + \beta_7 {}^*F_7(EGR^2) + \beta_8 {}^*F_8(EGR) + \beta_9 {}^*F9(m_f {}^*EGR). \quad (3)$$

When the ECM 114 switches to an injection mode involving multiple injection pulses per cylinder combustion event, the ECM 114 may adjust the injection timing and/or the injection amount to cause reforming. Reforming is an exothermic reaction, rather than a compression ignition event, and is initiated by a spark. The ECM 114 may use an initial injection pulse for reforming to heat cylinder walls so that a subsequent injection pulse results in compression ignition. The ECM 114 may inject a first amount of fuel at a first crank angle to cause reforming, and a second amount of fuel at a second crank angle to cause combustion. The second amount may be greater than the first amount, and the second crank angle may be greater than the first crank angle.

When the ECM 114 commands a double injection pulse with reforming for each cylinder combustion event, the torque estimation module 204 may use a torque relationship such as $$T_e = \gamma_0 + \gamma_1 {}^*F_1(m_f^2) + \gamma_2 {}^*F_2(m_f) + \gamma_3 {}^*F_3(SOI_1^2) + \gamma_4 {}^*F_4(SOI_1) + \gamma_5 {}^*F_5(m_f {}^*SOI_1) + \gamma_6 {}^*F_6(m_f {}^*SOI_1^2) + \gamma_7 {}^*F_7(EGR^2) + \gamma_8 {}^*F_8(EGR) + \gamma_9 {}^*F_9(m_f {}^*EGR) + \gamma_{10} {}^*F_{10}(m_f {}^*EGR^2) + \gamma_{11} {}^*F_{11}(SOI_2^2) + \gamma_{12} {}^*F_{12}(SOI_2) + \gamma_{13} {}^*F_{13}(m_f {}^*SOI_2) + \gamma_{14} {}^*F_{14}(m_f {}^*SOI_2^2). \quad (4)$$

When the ECM 114 commands a double injection pulse without reforming for each cylinder combustion event, the torque estimation module 204 may use a torque relationship such as $$T_e = \delta_0 + \delta_1 {}^*F_1(m_f^2) + \delta_2 {}^*F_2(m_f) + \delta_3 {}^*F_3((SOI)_1^2) + \delta_4 {}^*F_4(SOI_1) + \delta_5 {}^*F_5(m_f {}^*SOI_1) + \delta_6 {}^*F_6(m_f {}^*SOI_1^2) + \delta_7 {}^*F_7(EGR^2) + \delta_8 {}^*F_8(EGR) + \delta_9 {}^*F_9(m_f {}^*EGR) + \delta_{10} {}^*F_{10}(m_f {}^*EGR^2) + \delta_{11} {}^*F_{11}(SOI_2^2) + \delta_{12} {}^*F_{12}(SOI_2) + \delta_{13} {}^*F_{13}(m_f {}^*SOI_2) + \delta_{14} {}^*F_{14}(m_f {}^*SOI_2^2). \quad (5)$$

When the ECM 114 commands a triple injection pulse for each cylinder combustion event, with or without reforming, the torque estimation module 204 may use a torque relationship such as $$T_e = \epsilon_0 + \epsilon_1 {}^*F_1(m_f^2) + \epsilon_2 {}^*F_2(m_f) + \epsilon_3 {}^*F_3((SOI)_1^2) + \epsilon_4 {}^*F_4(SOI_1) + \epsilon_5 {}^*F_5(m_f {}^*SOI_1) + \epsilon_6 {}^*F_6(m_f {}^*SOI_1^2) + \epsilon_7 {}^*F_7(EGR^2) + \epsilon_8 {}^*F_8(EGR) \epsilon_9 {}^*F_9(m_f {}^*EGR) + \epsilon_{10} {}^*F_{10}(m_f {}^*EGR^2) + \epsilon_{11} {}^*F_{11}(SOI_3^2) + \epsilon_{12} {}^*F_{12}(SOI_3) + \epsilon_{13} {}^*F_{13}(m_f {}^*SOI_3) + \epsilon_{14} {}^*F_{14}(m_f {}^*SOI_3^2). \quad (6)$$

When the ECM 114 commands a quad injection pulse for each cylinder combustion event, with or without reforming, the torque estimation module 204 may use a torque relationship such as $$T_e = \epsilon_0 + \epsilon_1 {}^*F_1(m_f^2) + \epsilon_2 {}^*F_2(m_f) + \epsilon_3 {}^*F_3((SOI)_1^2) + \epsilon_4 {}^*F_4(SOI_1) + \epsilon_5 {}^*F_5(m_f {}^*SOI_1) + \epsilon_6 {}^*F_6(m_f {}^*SOI_1^2) + \epsilon_7 {}^*F_7(EGR^2) + \epsilon_8 {}^*F_8(EGR) + \epsilon_9 {}^*F_9(m_f {}^*EGR) + \epsilon_{10} {}^*F_{10}(m_f {}^*EGR^2) + \epsilon_{11} {}^*F_{11}(SOI_4^2) + \epsilon_{12} {}^*F_{12}(SOI_4) + \epsilon_{13} {}^*F_{13}(m_f {}^*SOI_4) + \epsilon_{14} {}^*F_{14}(m_f {}^*SOI_4^2). \quad (7)$$

The mass determination module 202 determines the fuel mass injected for each cylinder combustion event in the engine 102. The mass determination module 202 may determine the fuel mass using a mass determination model, such as an equation and/or a lookup table, which relates engine operation conditions to an estimated mass. The torque estimation model may be inverted to obtain the mass determination model. Thus, the mass determination module 202 may use different mass determination models for different fuel injection modes. In one example, for a desired torque request ($T_{des}$), such as a driver torque request, the fuel mass ($m_f$) may be determined based on $$m_f = T_e^{-1}(m_f) = f(N_g, NVO, T_{des}, \theta_{spark}, SOI, EGR, AFR). \quad (8)$$

A speed determination module 206 determines the engine speed. The speed determination module 206 may determine the engine speed based on the crank angle detected by the crankshaft position sensor 180. The speed determination module 206 may determine the engine speed by calculating a derivative of the crank angle with respect to time.

An overlap determination module 208 determines the negative valve overlap. Valve overlap is a difference between a crank angle at which an exhaust valve closes and a crank angle at which an intake valve opens. In HCCI engines, there is typically a lag between an exhaust valve closing and an intake valve opening. Thus, valve overlap is typically negative and may be referred to as negative valve overlap.

The overlap determination module 208 may determine the negative valve overlap based on the crank angle detected by the crankshaft position sensor 180 and a valve position received from a valve control module 210. The valve control module 210 may output the valve position to the valve actuator module 158 to control actuation of the intake valve 122 and the exhaust valve 130, which are shown in FIG. 1.

A driver torque module 212 determines the driver torque request based on a driver input from the driver input module 104. The driver input may be based on a position of an accelerator pedal. The driver input may also be based on cruise control, which may be an adaptive cruise control system that varies vehicle speed to maintain a predetermined following distance. The driver torque module 212 may store one or more mappings of accelerator pedal position to desired torque, and may determine the driver torque request based on a selected one of the mappings.

A spark determination module 214 determines a spark advance of the engine 102. The spark determination module 214 may determine the spark advance based on the desired torque request and an inverse of the torque estimation model. Accordingly, the spark determination module 214 may determine the spark advance based on the fuel injection mode. For example, the spark advance for reforming may be set to a greater value than the spark advance for spark ignition. The spark determination module 214 may output the spark advance to a spark control module 216. The spark control module 216 may output the spark advance to the spark actuator module 126.

An injection determination module 218 determines the crank angle at the start of injection. The injection determination module 218 may determine the crank angle at the stop of injection, which may be used in place of the crank angle at the start of injection in the output torque relationships and fuel mass relationships discussed above. The injection determination module 218 may determine the crank angle at the start or stop of injection based on the crank angle detected by the crankshaft position sensor 180 and an injection timing output by a fuel control module 220. The fuel control module 220 may output the injection timing to the fuel actuator module 124.

A throttle control module 222 may operate the engine 102 in a fuel lead mode by controlling air flow based on fuel flow. In contrast, spark ignition engines may be operated in an air lead mode to maintain a stoichiometric air/fuel ratio by controlling fuel flow based on air flow. The engine 102 may be operated in the fuel lead mode because fuel flow has a greater affect on combustion than air flow or spark in HCCI engines. The throttle control module 222 may output a throttle position to the throttle actuator module 172 based on the fuel mass and an inverse of the torque estimation module. Additionally or alternatively, the throttle position may be adjusted to achieve a desired manifold air pressure and a desired negative valve overlap.

A flow determination module 224 determines the mass flow rate of exhaust flowing through the EGR valve 170. The flow determination module 224 may determine the mass flow rate based on the amount that the EGR valve 170 is opened and a pressure difference across the EGR valve 170. The flow determination module 224 may determine the pressure difference based on pressures received from the upstream exhaust pressure sensor 174 and the downstream pressure sensor 176. The flow determination module 224 may determine the EGR opening amount based on a valve position received from an EGR control module 226. The EGR control module 226 may output the valve position to the EGR actuator module 172 to control the EGR valve 170.

An oxygen determination module 228 determines an oxygen level in the intake manifold 110. The oxygen determination module 228 may determine the oxygen level based on the oxygen level detected by the intake oxygen sensor 185. The oxygen determination module 228 may determine an oxygen flow rate based on the oxygen level and the mass airflow detected by the mass air flow sensor 186. The oxygen level or flow rate may be used in place of the EGR flow rate in the above relationships.

An air/fuel ratio determination module 230 determines the air/fuel ratio of the engine 102. The air/fuel ratio determination module 230 may determine the air/fuel ratio based on the oxygen level detected by the exhaust oxygen sensor 135. The torque estimation module 204 may estimate the torque output of the engine 102 based on fuel mass, the engine speed, the EGR flow rate, the intake oxygen level, the negative valve overlap, and/or the air/fuel ratio. The torque estimation module 204 may also estimate the torque output based on additional factors. The selection of the additional factors may depend on whether the air/fuel ratio is lean or stoichiometric.

In HCCI engines, when the air/fuel ratio is stoichiometric, spark advance affects torque, but to a lesser extent than in SI engines. When the air/fuel ratio is lean, spark advance has an even lesser effect on torque, but injection timing affects torque. Thus, when the air/fuel ratio is lean, the torque estimation module 204 may estimate the torque output based on the crank angle at the start or stop of fuel injection, which may be referred to as an injection angle. When the air/fuel ratio is stoichiometric, the torque estimation module 204 may estimate the torque output based on the spark advance.

Figure 3:
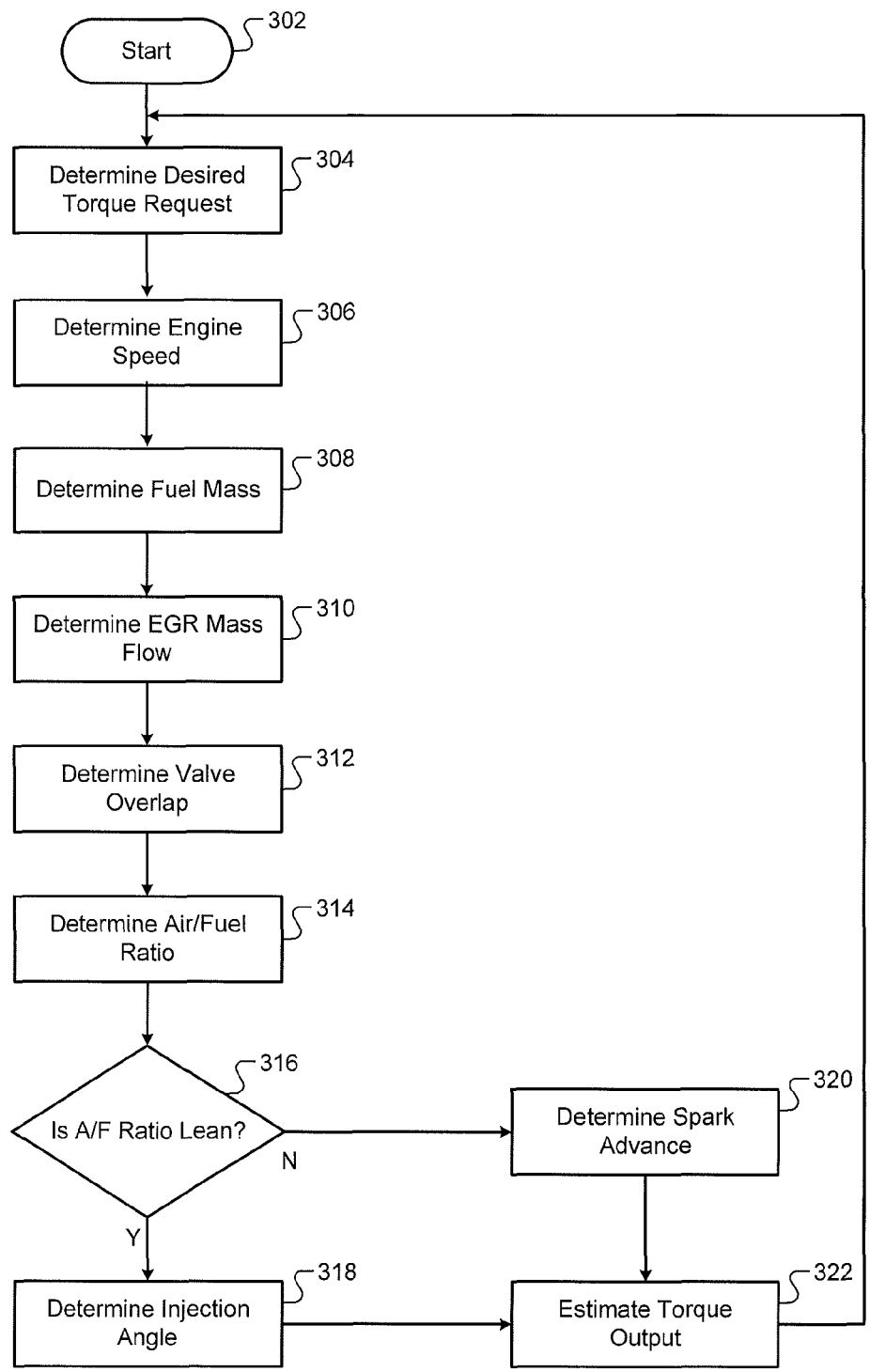
FIG. 3 is a flowchart illustrating an example powertrain control method according to the principles of the present disclosure.

Referring now to FIG. 3, a method for estimating torque output of an HCCI engine and determining a fuel mass injected per cylinder combustion event in the HCCI engine begins at 302. At 304, the method determines a driver torque request associated with the HCCI engine. The method may determine the driver torque request as discussed above with respect to the driver torque module 212. At 306, the method determines an engine speed of the HCCI engine. The method may determine the engine speed based on a crankshaft position detected by a crankshaft position sensor.

At 308, the method determines a fuel mass injected per cylinder combustion event in the HCCI engine. The method may determine the fuel mass based on the driver torque request and the engine speed using a mass determination model. The mass determination model may be obtained by inverting a torque estimation model. Different mass determination models and different torque estimation models may be used for different operating conditions of the HCCI engine.

At 310, the method determines a mass flow rate through an EGR valve of the HCCI engine. The method may determine the mass flow rate based on a pressure difference across the EGR valve and a position of the EGR valve.

At 312, the method determines a valve overlap of the HCCI engine. The valve overlap is a difference between a crank angle at which an exhaust valve closes and a crank angle at which the intake valve opens. In HCCI engines, this difference may be negative, and the valve overlap may be referred to as negative valve overlap.

At 314, the method determines an air/fuel ratio of the HCCI engine. The method may determine the air/fuel ratio based on an oxygen level in exhaust from the HCCI engine. At 316, the method determines whether the air/fuel ratio is lean. If 316 is true, the method continues at 318 and determines an injection angle of the HCCI engine. The injection angle is the crank angle at which fuel injection is started or stopped.

If 316 is false, the method continues at 320 and determines a spark advance of the HCCI engine. The method may determine the spark advance based on the operating conditions of the HCCI engine. For example, the method may select a first spark advance when reforming is desired and a second spark advance when spark ignition is desired. The first spark advance may be greater than the second spark advance. No spark may be generated when compression ignition is desired.

At 322, the method estimates the torque output of the HCCI engine based on the fuel mass, the engine speed, the EGR mass flow rate, the valve overlap, and/or the air/fuel ratio. When the air/fuel ratio is lean, the method may estimate the torque output based on the injection angle. When the air/fuel ratio is stoichiometric, the method may estimate the torque output based on the spark advance. In addition, the method may estimate the torque output based on an oxygen level in an intake manifold rather than the EGR mass flow rate.

Figure 4:
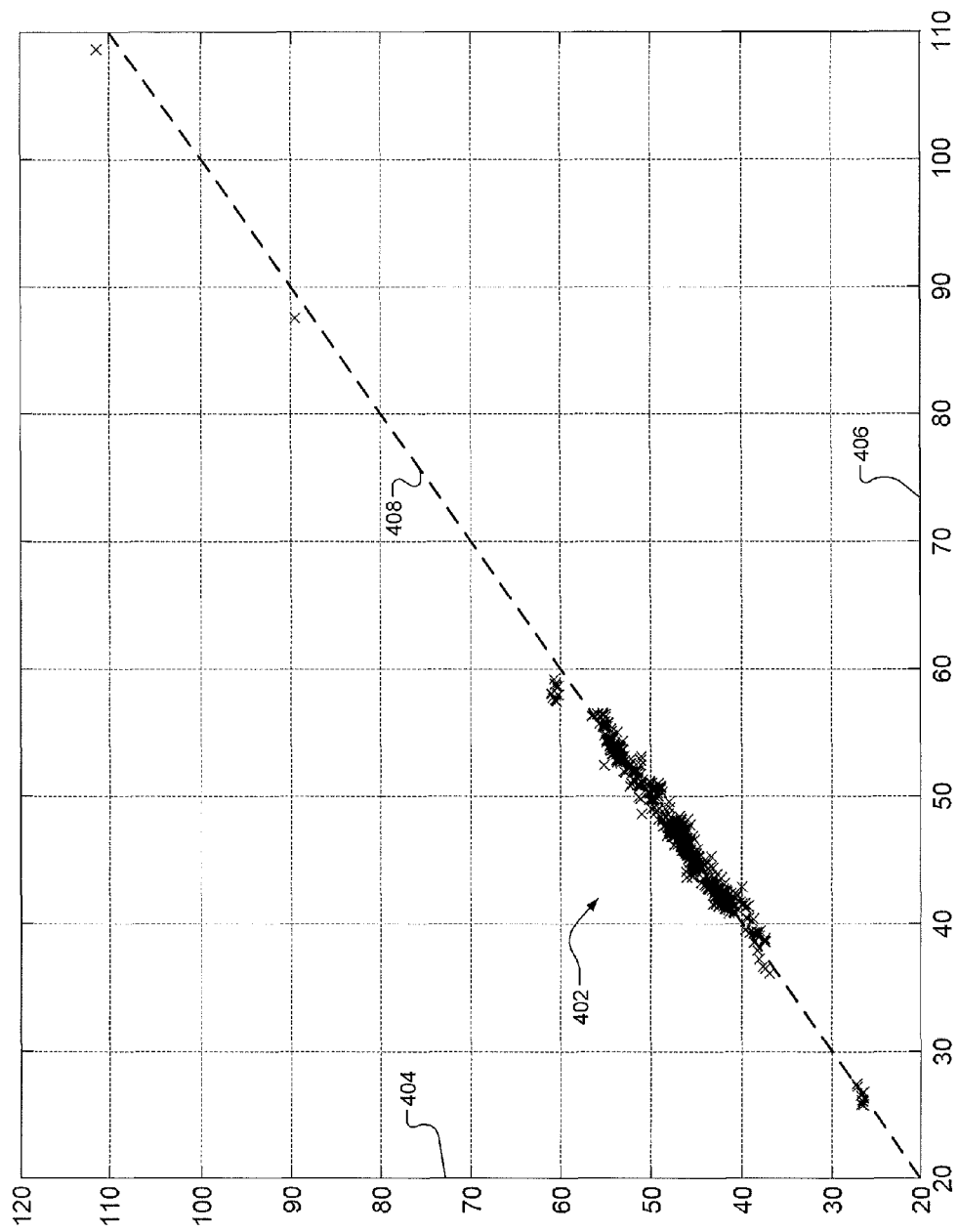
FIGS. 4 and 5 are graphs illustrating example estimated engine torques according to the principles of the present disclosure.

Referring now to FIG. 4, data points 402 illustrate the accuracy of an HCCI engine torque estimation model according to the principles of the present disclosure. The data points 402 correspond to an HCCI engine operating at a lean air/fuel ratio. Each of the data points 402 indicates an estimated torque 404 represented by the y-axis in Newton-meters (Nm) and a measured torque 406 represented by the x-axis in Nm. A zero error line 408 represents the location the data points 402 when there is zero error between the estimated torque 404 and the measured torque 406. As shown in FIG. 4, the data points 402 are at or near the zero error line 408.

Figure 5:
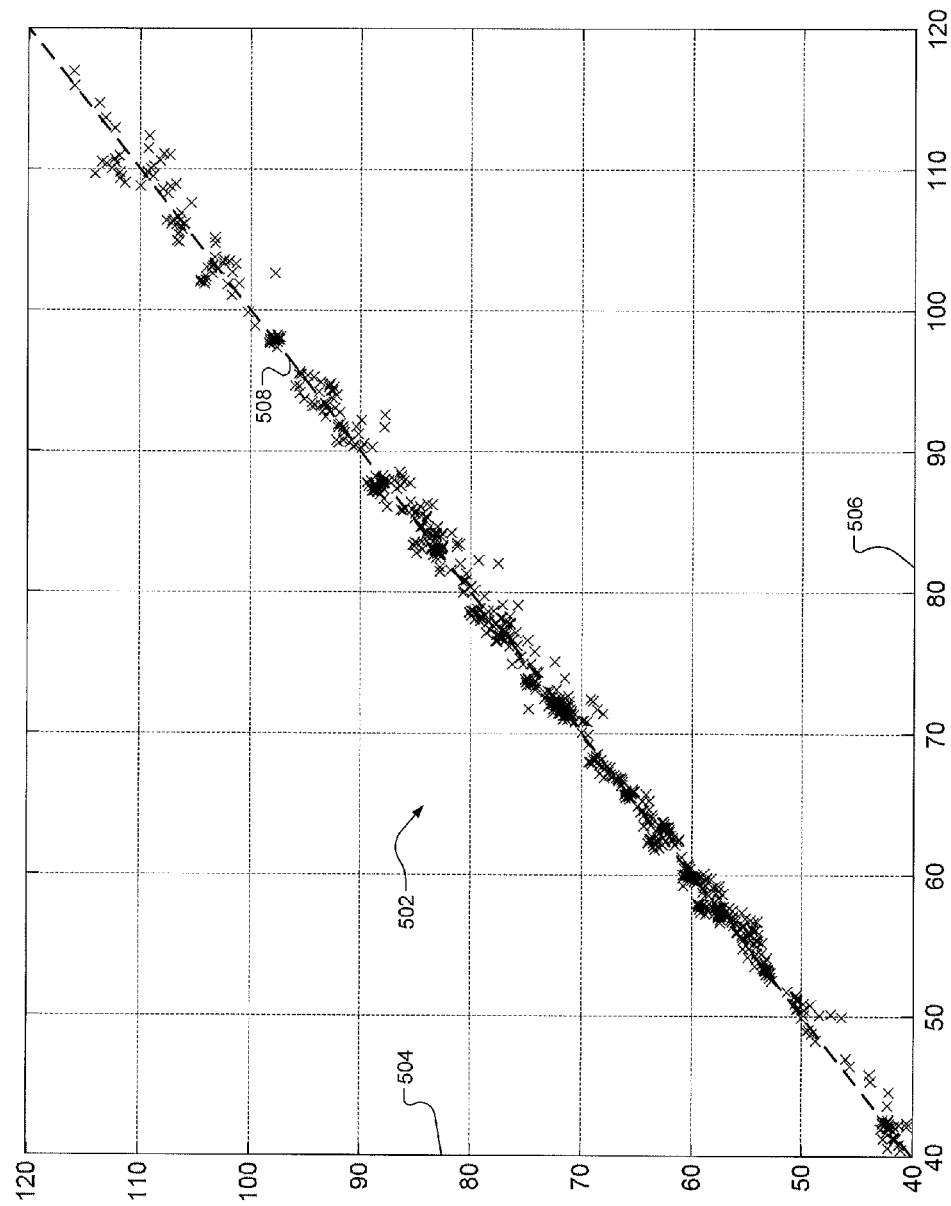

Referring now to FIG. 5, data points 502 illustrate the accuracy of an HCCI engine torque estimation model according to the principles of the present disclosure. The data points 502 correspond to an HCCI engine operating at a stoichiometric air/fuel ratio. Each of the data points 502 indicates an estimated torque 504 represented by the y-axis in Newton-meters (Nm) and a measured torque 506 represented by the x-axis in Nm. A zero error line 508 represents the location the data points 502 when there is zero error between the estimated torque 504 and the measured torque 506. As shown in FIG. 5, the data points 502 are at or near the zero error line 508.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
a fuel control module that controls a fuel injector to provide multiple fuel injection pulses to a cylinder of a homogeneous charge compression ignition (HCCI) engine for a combustion event in the cylinder; and
a torque estimation module that estimates a torque output of the HCCI engine based on a value of an engine operating parameter associated with one of the fuel injection pulses.

2. The system of claim 1, further comprising a speed determination module that determines an engine speed of the HCCI engine, wherein the torque estimation module estimates the torque output of the HCCI engine based on the engine speed.

3. A system comprising:
a mass determination module that determines a fuel mass injected into a cylinder of a homogeneous charge compression ignition (HCCI) engine for a combustion event in the cylinder;
a torque estimation module that estimates a torque output of the HCCI engine based on the fuel mass; and
a flow determination module that determines an actual mass flow rate through an exhaust gas recirculation valve, wherein the torque estimation module estimates the torque output of the HCCI engine based on the actual mass flow rate.

4. The system of claim 2, further comprising an overlap determination module that determines a valve overlap based on a difference between a first crank angle at which an exhaust valve closes and a second crank angle at which an intake valve opens, wherein the torque estimation module estimates the torque output of the HCCI engine based on the valve overlap.

5. The system of claim 2, further comprising an air/fuel ratio determination module that determines an air/fuel ratio of the HCCI engine, wherein the torque estimation module estimates the torque output of the HCCI engine based on the air/fuel ratio.

6. The system of claim 5, further comprising an injection determination module that determines an injection angle at which fuel injection is one of started and stopped, wherein the torque estimation module selectively estimates the torque output of the HCCI engine based on the injection angle.

7. The system of claim 6, wherein the torque estimation module estimates the torque output of the HCCI engine based on the injection angle when the air/fuel ratio is lean.

8. The system of claim 5, further comprising a spark determination module that determines a spark advance of the HCCI engine, wherein the torque estimation module selectively estimates the torque output of the HCCI engine based on the spark advance.

9. The system of claim 8, wherein the torque estimation module estimates the torque output of the HCCI engine based on the spark advance when the air/fuel ratio is stoichiometric.

10. A method comprising:
controlling a fuel injector to provide multiple fuel injection pulses to a cylinder of a homogeneous charge compression ignition (HCCI) engine for a combustion event in the cylinder; and
estimating a torque output of the HCCI engine based on a value of an engine operating parameter associated with one of the fuel injection pulses.

11. The method of claim 10, further comprising:
determining an engine speed of the HCCI engine; and
estimating the torque output of the HCCI engine based on the engine speed.

12. A method comprising:
determining a fuel mass injected into a cylinder of a homogeneous charge compression ignition (HCCI) engine for a combustion event in the cylinder; and
estimating a torque output of the HCCI engine based on the fuel mass;
determining an actual mass flow rate through an exhaust gas recirculation valve; and
estimating the torque output of the HCCI engine based on the actual mass flow rate.

13. The method of claim 11, further comprising:
determining a valve overlap based on a difference between a first crank angle at which an exhaust valve closes and a second crank angle at which an intake valve opens; and
estimating the torque output of the HCCI engine based on the valve overlap.

14. The method of claim 11, further comprising:
determining an air/fuel ratio of the HCCI engine; and
estimating the torque output of the HCCI engine based on the air/fuel ratio.

15. The method of claim 14, further comprising:
determining an injection angle at which fuel injection is one of started and stopped; and
selectively estimating the torque output of the HCCI engine based on the injection angle.

16. The method of claim 15, further comprising estimating the torque output of the HCCI engine based on the injection angle when the air/fuel ratio is lean.

17. The method of claim 14, further comprising:
determining a spark advance of the HCCI engine; and
selectively estimating the torque output of the HCCI engine based on the spark advance.

18. The method of claim 17, further comprising estimating the torque output of the HCCI engine based on the spark advance when the air/fuel ratio is stoichiometric.

19. The system of claim 1, wherein the torque estimation module estimates the torque output of the HCCI engine based on values of the engine operating parameter associated with each of the fuel injection pulses.

20. The system of claim 1, wherein the engine operating parameter is a crank angle of the HCCI engine at a start of injection.

21. The method of claim 10, further comprising estimating the torque output of the HCCI engine based on values of the engine operating parameter associated with each of the fuel injection pulses.

22. The method of claim 10, wherein the engine operating parameter is a crank angle of the HCCI engine at a start of injection.

* * * * *